United States Patent
Wang et al.

(10) Patent No.: US 10,913,812 B2
(45) Date of Patent: Feb. 9, 2021

(54) SECONDARY AMINE, RADICAL, AND ALKOXY AMINE COMPOUND

(71) Applicant: INDUSTRIAL TECHNOLOGY RESEARCH INSTITUTE, Hsinchu (TW)

(72) Inventors: Meng-Wei Wang, Taichung (TW); Yu-Min Han, Taichung (TW); Chih-Hsiang Lin, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 123 days.

(21) Appl. No.: 16/262,667

(22) Filed: Jan. 30, 2019

(65) Prior Publication Data

US 2020/0079889 A1    Mar. 12, 2020

Related U.S. Application Data

(60) Provisional application No. 62/729,658, filed on Sep. 11, 2018.

(30) Foreign Application Priority Data

Oct. 23, 2018   (TW) .............................. 107137351 A

(51) Int. Cl.
C08F 293/00   (2006.01)
C07F 9/6574   (2006.01)

(52) U.S. Cl.
CPC ...... *C08F 293/005* (2013.01); *C07F 9/65744* (2013.01); *C08F 2438/02* (2013.01)

(58) Field of Classification Search
CPC .................................................. C07F 9/65744
See application file for complete search history.

(56) References Cited

U.S. PATENT DOCUMENTS

| 4,742,088 A | 5/1988 | Kim |
| 6,624,322 B1 | 9/2003 | Gillet et al. |

(Continued)

FOREIGN PATENT DOCUMENTS

| CN | 101709137 A | 5/2010 |
| CN | 103965247 A | 8/2014 |
| CN | 104592475 A | 5/2015 |

(Continued)

OTHER PUBLICATIONS

Extended European Search Report, dated Aug. 20, 2019, for European Application No. 19160161.6.
Garth et al., "Synthesis of a new phosphorylated ethylamine, thereon based phosphonamidates and their application as flame retardants", Heteroatom Chemistry, vol. 28, No. 6, Dec. 10, 2017, pp. 1-9 (9 pages).
Taiwanese Office Action and Search Report for Taiwanese Application No. 107137351, dated Jan. 10, 2020.
Benoit et al., "Development of a Universal Alkoxyamine for "Living" Free Radical Polymerizations", J. Am. Chem. Soc. 1999, 121, pp. 3904-3920.

(Continued)

*Primary Examiner* — Wenwen Cai
(74) *Attorney, Agent, or Firm* — Birch, Stewart, Kolasch & Birch, LLP

(57) ABSTRACT

An alkoxy amine compound is provided, which has a chemical structure of:

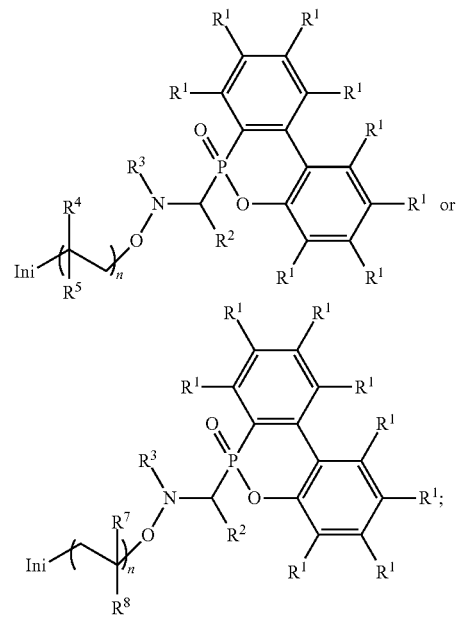

wherein each of $R^1$ is independently H, $C_{1-6}$ alkyl group, or $C_{1-6}$ alkoxy group; $R^2$ is $C_{1-6}$ alkyl group, $R^3$ is —$(C_xH_{2x})$—OH or —$(C_xH_{2x+1})$, and x is 1 to 8; $R^4$ is H or $C_{1-6}$ alkyl group; $R^5$ is

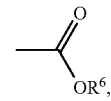

and $R^6$ is H or $C_{1-8}$ alkyl group; $R^7$ is H or $C_{1-6}$ alkyl group, $R^8$ is

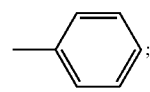

Ini is a residual group of a radical initiator; and n is an integer of 1 to 10000.

7 Claims, No Drawings

(56) References Cited

U.S. PATENT DOCUMENTS

2005/0020739 A1* 1/2005 Dittrich ............. C07F 9/657172
  524/117
2006/0194045 A1* 8/2006 Masuda .................... D01F 6/84
  428/364

FOREIGN PATENT DOCUMENTS

| CN | 104910327 A | 9/2015 |
| CN | 105254866 A | 1/2016 |
| CN | 103694434 B | 2/2016 |
| CN | 107400492 A | 11/2017 |
| CN | 107459957 A | 12/2017 |
| TW | 201623274 A | 7/2016 |
| TW | I540126 B | 7/2016 |

OTHER PUBLICATIONS

Marx et al., "Synthesis and evaluation of a new polar, TIPNO type nitroxide for "living" free radical polymerization", Polymer 50 (2009), pp. 2752-2761.

Studer et al., "New Sterically Hindered Nitroxides for the Living Free Radical Polymerization: X-ray Structure of an α-H-Bearing Nitroxide", Macromolecules 2004, 37, pp. 27-34.

* cited by examiner

SECONDARY AMINE, RADICAL, AND ALKOXY AMINE COMPOUND

CROSS REFERENCE TO RELATED APPLICATIONS

This application claims the benefit of U.S. Provisional Application No. 62/729,658 filed on Sep. 11, 2018, and claims priority from, Taiwan Application Serial Number 107137351, filed on Oct. 23, 2018, the entirety of which are incorporated by reference herein.

TECHNICAL FIELD

The technical field relates to secondary amine, radical formed from the secondary amine, and alkoxy amine compound formed from the radical.

BACKGROUND

The major conventional method of forming block copolymers is controlled/living radical polymerization (CRP), which includes nitroxide mediated polymerization (NMP), atom transfer radical polymerization (ATRP), or reversible addition fragmentation chain transfer (RAFT). The requirements for the NMP condition are lower than those for the ATRP condition, meaning that the NMP is more feasible. The NMP initiator is free of sulfur atoms, and the color of the NMP product is lighter than the color of the RAFT product. As such, NMP has inherent advantages for application in optical PMMA. However, nitroxide initiator (the critical technology of NMP) is usually synthesized in several steps. Accordingly, a simplified method of synthesizing a novel nitroxide for NMP is called for.

SUMMARY

One embodiment of the disclosure provides a secondary amine, having a chemical structure of:

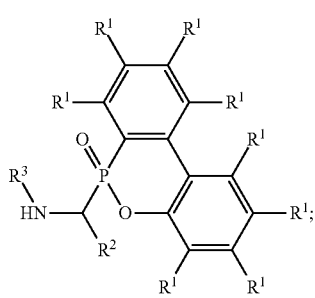

wherein each of $R^1$ is independently H, $C_{1-6}$ alkyl group, or $C_{1-6}$ alkoxy group; $R^2$ is $C_{1-6}$ alkyl group; and $R^3$ is $-(C_xH_{2x})-OH$ or $-(C_xH_{2x+1})$, and x is 1 to 8.

One embodiment of the disclosure provides a radical, having a chemical structure of:

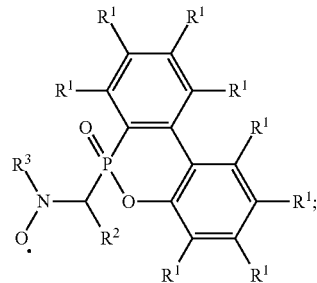

wherein each of $R^1$ is independently H, $C_{1-6}$ alkyl group, or $C_{1-6}$ alkoxy group; $R^2$ is $C_{1-6}$ alkyl group; and $R^3$ is $-(C_xH_{2x})-OH$ or $-(C_xH_{2x+1})$, and x is 1 to 8.

One embodiment of the disclosure provides an alkoxy amine compound, having a chemical structure of:

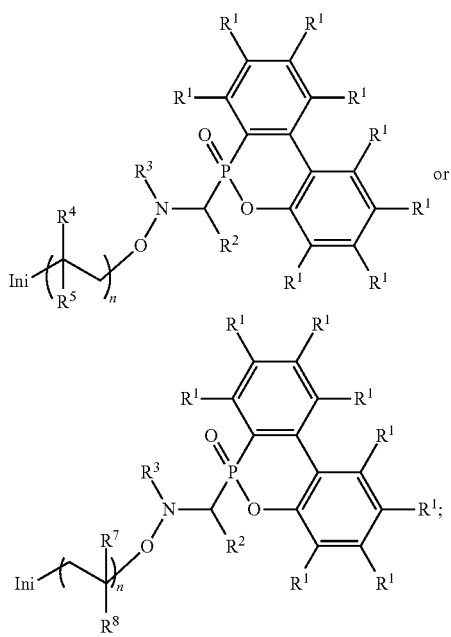

wherein each of $R^1$ is independently H, $C_{1-6}$ alkyl group, or $C_{1-6}$ alkoxy group; $R^2$ is $C_{1-6}$ alkyl group; $R^3$ is $-(C_xH_{2x})-OH$ or $-(C_xH_{2x+1})$, and x is 1 to 8; $R^4$ is H or $C_{1-6}$ alkyl group; $R^5$ is

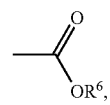

and $R^6$ is H or $C_{1-8}$ alkyl group; $R^7$ is H or $C_{1-6}$ alkyl group, $R^8$ is

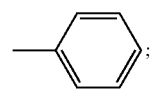

Ini is a residual group of a radical initiator; and n is an integer of 1 to 10000.

A detailed description is given in the following embodiments.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details.

One embodiment of the disclosure provides a secondary amine and a method of forming the same. For example, a primary amine and an aldehyde can react with each other at room temperature to form an intermediate, which can further react with a derivative of DOPO (9,10-dihydro-9-oxa-10-phosphaphenanthrene 10-oxide) at room temperature to form the secondary amine. The reaction is shown below:

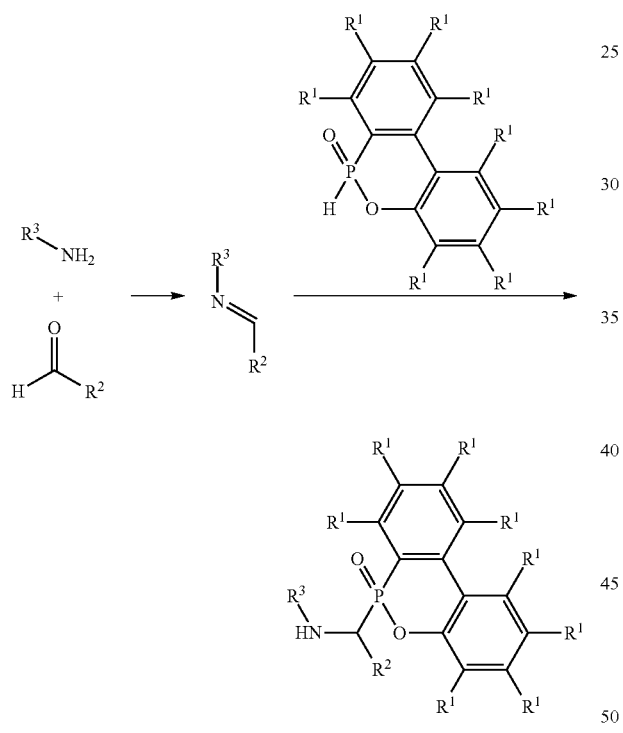

In the above reaction, each of $R^1$ is independently H, $C_{1-6}$ alkyl group, or $C_{1-6}$ alkoxy group. $R^2$ is $C_{1-6}$ alkyl group. $R^3$ is —$(C_xH_{2x})$—OH or —$(C_xH_{2x+1})$, and x is 1 to 8. In some embodiments, $R^2$ is $C_{2-4}$ alkyl group. In some embodiments, x is 2 to 5. For example, each $R^1$ is H, $R^2$ is isopropyl group (e.g. the aldehyde is isobutyraldehyde), and $R^3$ is hydroxyethyl group (e.g. the primary amine is ethanolamine) or butyl group (e.g. the primary amine is butyl amine). The above reaction may form the secondary amine compound of high purity at room temperature without additional purification (e.g. column chromatography), thereby dramatically lowering the manufacturing cost.

In one embodiment, the secondary amine can be further oxidized to form a radical, which has a chemical structure of

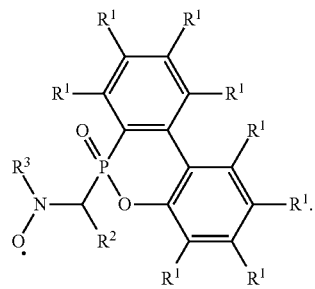

In the above chemical structure, each of $R^1$ is independently H, $C_{1-6}$ alkyl group, or $C_{1-6}$ alkoxy group; $R^2$ is $C_{1-6}$ alkyl group; and $R^3$ is —$(C_xH_{2x})$—OH or —$(C_xH_{2x+1})$, and x is 1 to 8. In some embodiments, $R^2$ is $C_{2-4}$ alkyl group. In some embodiments, x is 2 to 5. In some embodiments, each $R^1$ is H, $R^2$ is isopropyl group, and $R^3$ is hydroxyethyl group or butyl group. For example, the secondary amine can be oxidized by an oxidant such as hydrogen peroxide, peracetic acid, pertrifluoroacetic acid, nitric acid, oxone, the like, or a combination thereof to form the radical. The radical may stably exist, and can collocate with another radical initiator (e.g. azobisisobutyronitrile (AIBN) or benzoyl peroxide (BPO)) to perform a NMP reaction of monomer having a double bond.

One embodiment of the disclosure provides an alkoxy amine compound, having a chemical structure of:

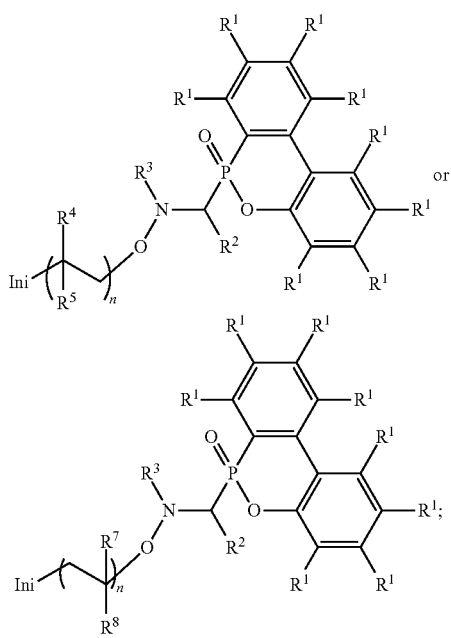

wherein each of $R^1$ is independently H, $C_{1-6}$ alkyl group, or $C_{1-6}$ alkoxy group; $R^2$ is $C_{1-6}$ alkyl group; $R^3$ is —$(C_xH_{2x})$—OH or —$(C_xH_{2x+1})$, and x is 1 to 8; $R^4$ is H or $C_{1-6}$ alkyl group; $R^5$ is

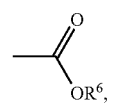

and $R^6$ is H or $C_{1-8}$ alkyl group; $R^7$ is H or $C_{1-6}$ alkyl group, $R^8$ is

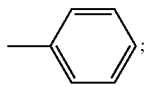

Ini is a residual group of a radical initiator; and n is an integer of 1 to 10000. In some embodiments, $R^2$ is $C_{2-4}$ alkyl group. In some embodiments, x is 2 to 5. In some embodiments, each $R^1$ is H, $R^2$ is isopropyl group, and $R^3$ is hydroxyethyl group or butyl group. In some embodiments, the radical initiator may include AIBN or BPO. For example, AIBN, the described radical, and monomer having a double bond can be heated and reacted under nitrogen to form the alkoxy amine compound, and the heating temperature is determined by the monomer having a double bond. For example, when the monomer having a double bond is butyl acrylate, the heating temperature can be about 60° C. When the monomer having a double bond is styrene, the heating temperature can be about 80° C. When the monomer having a double bond is methyl methacrylate, the heating temperature can be about 110° C. $R^4$, $R^5$, $R^7$, and $R^8$ are determined by the monomer having a double bond. For example, when the monomer having a double bond is butyl acrylate, $R^4$ will be H, $R^5$ will be

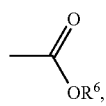

and $R^6$ will be butyl group. When the monomer having a double bond is styrene, $R^7$ will be H, $R^8$ will be

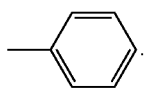

When the monomer having a double bond is methyl methacrylate, $R^4$ will be methyl group, $R^5$ will be

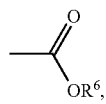

and $R^6$ will be methyl group. Compared to the conventional NMP mechanism, the heating temperature is lower and the polymerization period is shorter for the radical in the disclosure, and the alkoxy amine compound of the disclosure has a higher number average molecular weight (Mn). For example, the reaction of forming the alkoxy amine compound is shown below:

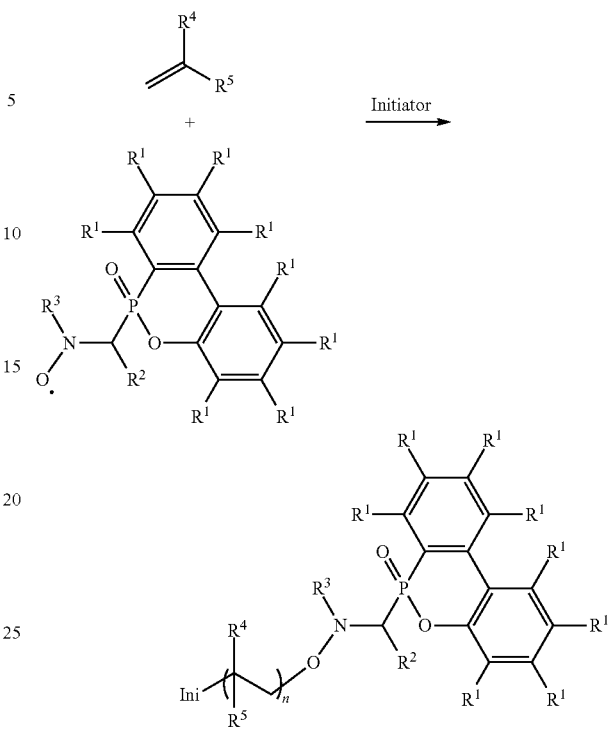

Alternatively, the reaction of forming the alkoxy amine compound can be

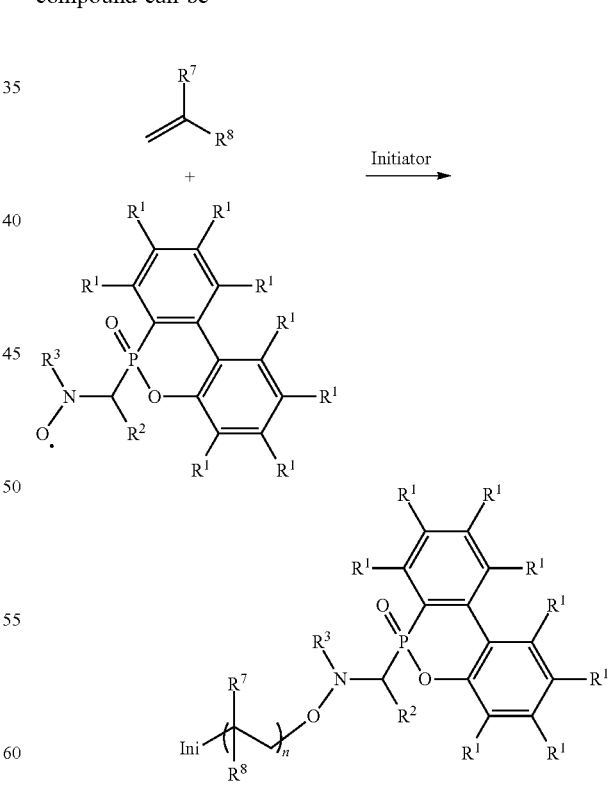

Ini is a residual group of a radical initiator, which is determined by the radical initiator type. On the other hand, one skilled in the art should understand that the above reaction is only illustrative and not intended to limit the disclosure. One skilled in the art may select suitable reagents

EXAMPLES

Preparation Example 1-1

11.81 g of isobutyraldehyde (0.1637 mole) was stirred at room temperature. Then, 10 g of ethanolamine (0.1637 mole) was added to the isobutyraldehyde in an ice bath. The ice bath was removed after the addition of ethanolamine, and the reaction was performed at room temperature (25° C.) for 12 hours to form an intermediate. About 50 mL of ethanol solution of DOPO (35.39 g, 0.1637 mole) was added to the intermediate, and then stirred at room temperature for 24 hours to form a white solid, which was naturally precipitated. The white solid was collected by vacuum filtering to obtain a filtered cake, which was a secondary amine product with high purity (yield was about 95%). The hydrogen spectrum of the secondary amine product was as follows: $^1$H-NMR (400 MHz, DMSO-$d_6$, δ, ppm): 10.93 (1H, NH), 8.03, 7.45, 7.26, 7.08, 6.91 (8H, aromatic H), 5.07 (1H, OH), 3.44, 2.76, 2.50, 1.87, 0.82 (12H, aliphatic H). The above reaction is shown below:

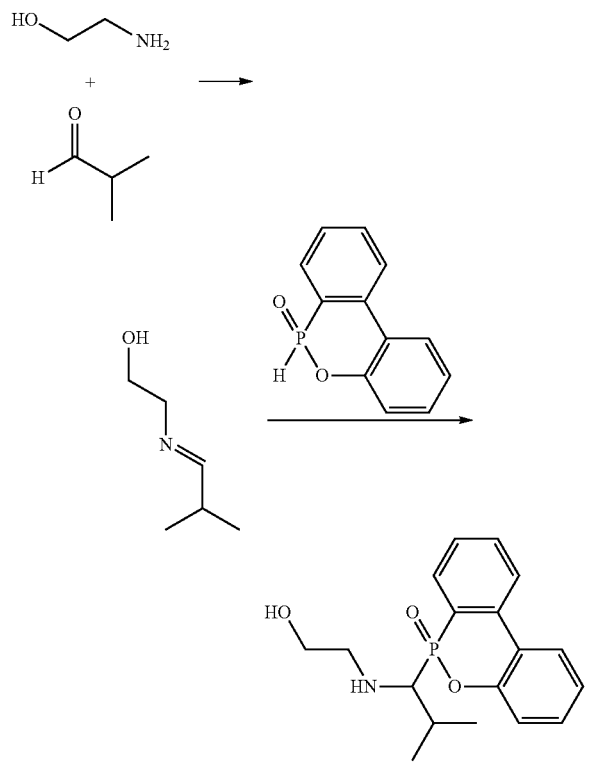

Preparation Example 1-2

1 g of the secondary amine product (3.018 mmole) in Preparation Example 1-1 was dissolved in 10 mL of dichloromethane and 3 mL of acetic acid to form a clear solution. 5 mL of hydrogen peroxide (30%) was added to the clear solution, and the mixture was stirred at room temperature and reacted for about 3 hours. The reacted aqueous solution was vigorously stirred, and 5% $Na_2CO_3$ solution was then added thereto for fine-tuning its pH value to about 5 to 6, thereby precipitating a large amount of white solid. The white solid was collected by vacuum filtering to obtain a filtered cake, which was washed by dichloromethane and then dried under vacuum at 50° C. for 1 hour, which was the radical product (yield was about 90%). The hydrogen spectrum and the mass spectrum of the radical product are as follows: $^1$H-NMR (400 MHz, DMSO-$d_6$, δ, ppm): 8.02, 7.42, 7.23, 7.05, 6.87 (8H, aromatic H), 3.80 (1H, OH), 3.60, 2.56, 2.50, 1.80, 0.60 (12H, aliphatic H). LC-HR/MS (ESI) m/z: $[M+2]^+$ calcd. for $C_{18}H_{21}NO_4P$. 346.3; anal., 465.0855. The above reaction is shown below:

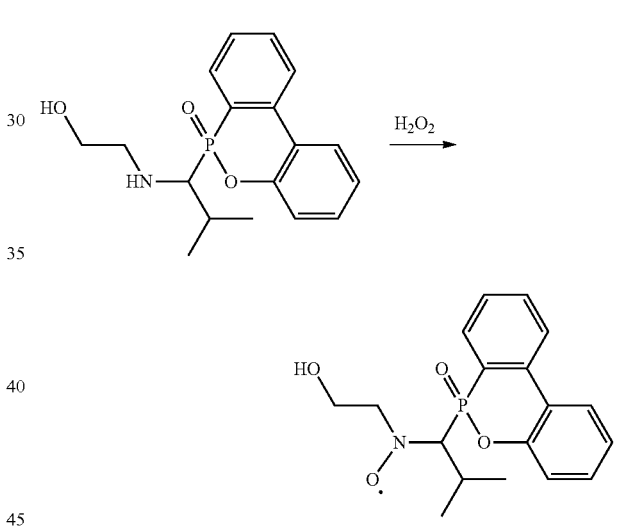

Preparation Example 2-1

11.81 g of isobutyraldehyde (0.1637 mole) was stirred at room temperature. Then, 11.98 g of butylamine (0.1637 mole) was added to isobutyraldehyde in an ice bath. The ice bath was removed after the addition of butylamine, and the reaction was performed at room temperature (25° C.) for 12 hours to form an intermediate. About 50 mL of ethanol solution of DOPO (35.39 g, 0.1637 mole) was added to the intermediate, and then stirred at room temperature for 24 hours to form a white solid, which was naturally precipitated. The white solid was collected by vacuum filtering to obtain a filtered cake, which was a secondary amine product with high purity (yield was about 95%). The hydrogen spectrum of the secondary amine product is as follows: $^1$H-NMR (400 MHz, CDCl$_3$, δ, ppm): 9.94 (1H, NH), 8.11, 7.51, 7.30, 7.22 (8H, aromatic H), 2.72, 2.31, 1.90, 1.25, 0.93, 0.78 (16H, aliphatic H). The above reaction is shown below:

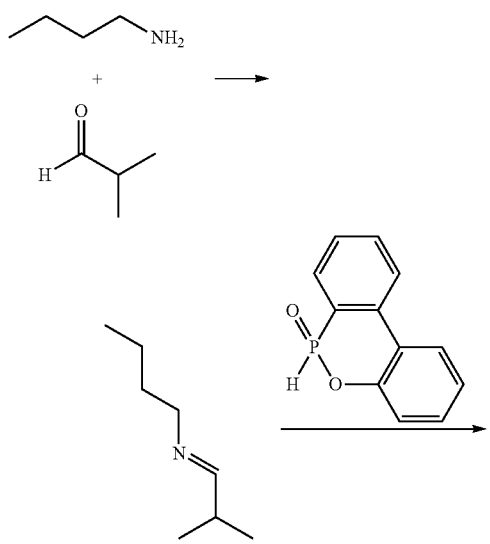

Preparation Example 2-2

1.04 g of the secondary amine product (3.018 mmole) in Preparation Example 2-1 was dissolved in 10 mL of dichloromethane and 3 mL of acetic acid to form a clear solution. 5 mL of hydrogen peroxide (30%) was added to the clear solution, and the mixture was stirred at room temperature and reacted for about 3 hours. The reacted aqueous solution was vigorously stirred, and 5% $Na_2CO_3$ solution was then added thereto for fine-tuning its pH value to about 5 to 6, thereby precipitating a large amount of white solid. The white solid was collected by vacuum filtering to obtain a filtered cake, which was washed by dichloromethane and then dried under vacuum at 50° C. for 1 hour, which was the radical product (yield was about 90%). The hydrogen spectrum of the radical product is as follows: $^1$H-NMR (400 MHz, $CDCl_3$, δ, ppm): 8.11, 7.51, 7.30, 7.20, 7.03 (8H, aromatic H), 2.78, 2.43, 2.26, 1.32, 1.21, 0.87 (16H, aliphatic H). The above reaction is shown below:

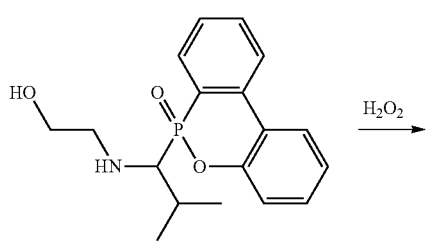

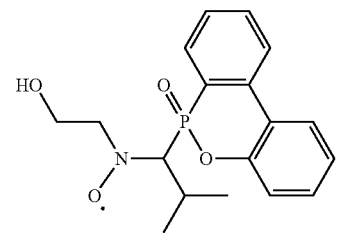

Example 1 n-Butylacrylate/the radical product in Preparation Example 1-2/AIBN (molar ratio=100/1/0.1) were added into a reaction bottle. Dimethylacetamide (DMAc) serving as solvent was added to the reaction bottle for preparing solution (50 wt %). The solution was bubbled with nitrogen to deoxygenate for 30 minutes, and then heated to 60° C. and stirred to be reacted for about 2.5 hours. The reaction result was analyzed by GPC to measure its Mn, Mn=161857. The above reaction is shown below:

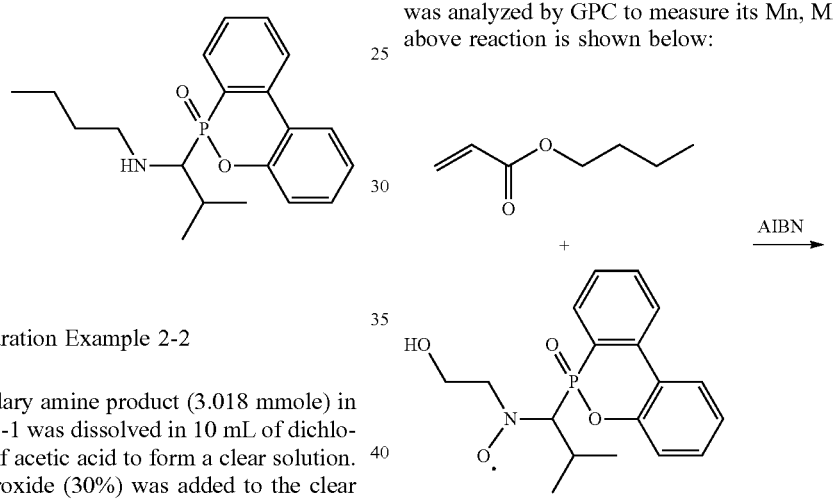

Example 2 n-Butylacrylate/the radical product in Preparation Example 2-2/AIBN (molar ratio=100/1/0.1) were added into a reaction bottle. DMAc serving as solvent was added to the reaction bottle for preparing solution (50 wt %). The solution was bubbled with nitrogen to deoxygenate for 30 minutes, and then heated to 60° C. and stirred to be reacted for about 1 hour. The reaction result was analyzed by GPC to measure its Mn, Mn=107857. The above reaction is shown below:

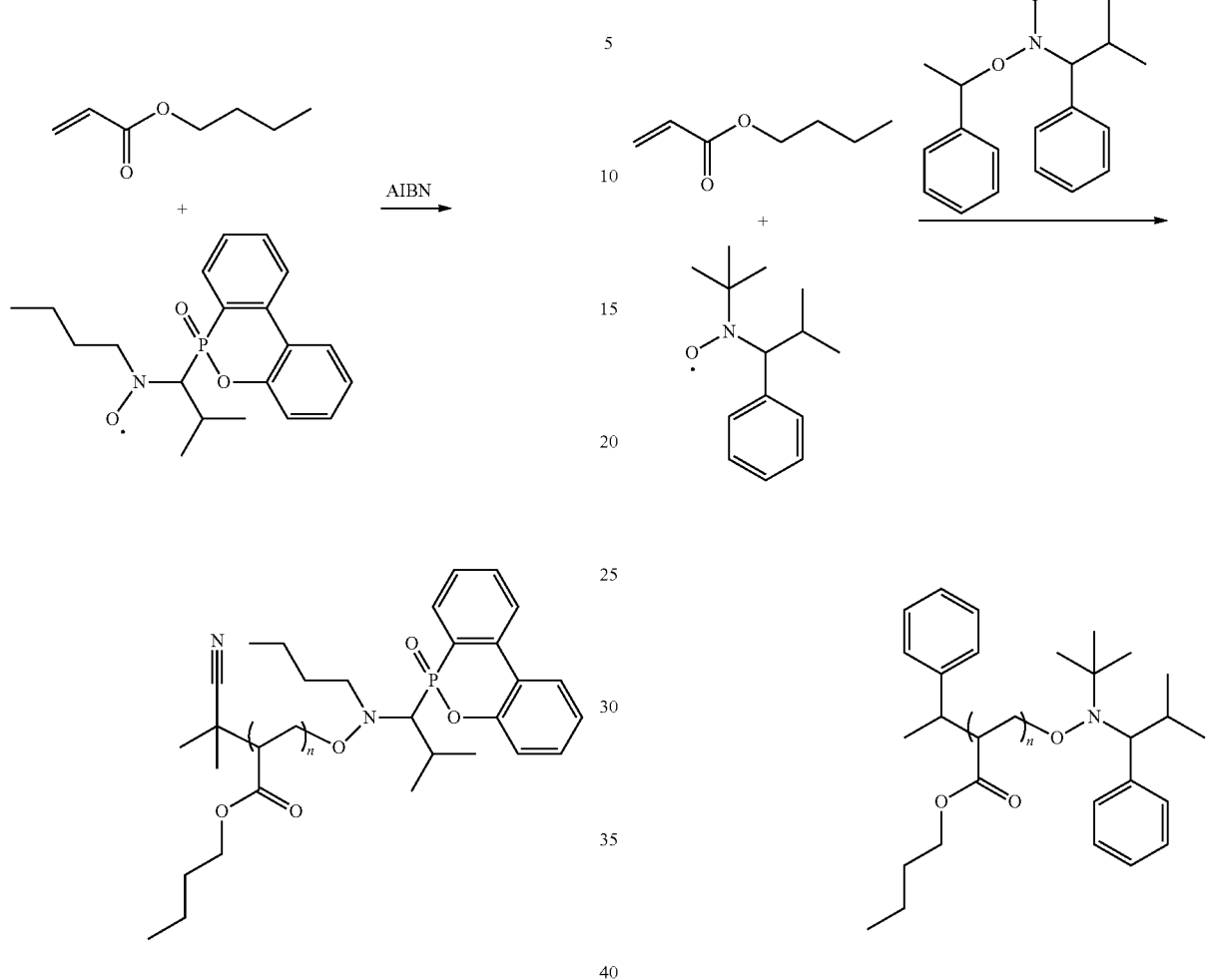

Comparative Example 1

Commercially available NMP reagents TIPNO and TIPNO•(commercially available from Sigma-Aldrich) and n-butylacrylate were polymerized for comparison. n-Butylacrylate/TIPNO•/TIPNO (molar ratio=100/1/0.1) were added into a reaction bottle. DMAc serving as solvent was added to the reaction bottle for preparing solution (50 wt %). The solution was bubbled with nitrogen to deoxygenate for 30 minutes, and then heated to 75° C. and stirred to be reacted for about 16 hours. The reaction result was analyzed by GPC to prove that no new reaction occurred.

Comparative Example 2 n-Butylacrylate/TIPNO•/TIPNO (molar ratio=100/1/0.1) were added into a reaction bottle. DMAc serving as solvent was added to the reaction bottle for preparing solution (50 wt %). The solution was bubbled with nitrogen to deoxygenate for 30 minutes, and then heated to 125° C. and stirred to be reacted for about 24 hours. The reaction result was analyzed by GPC to measure its Mn, Mn=14981. The above reaction is shown below:

As shown in the comparison between Example 1, Example 2, and Comparative Example 2, Mn of the polymers formed at a lower temperature during shorter periods in Examples 1 and 2 were dramatically larger than Mn of the polymer formed at a higher temperature during a longer period in Comparative Example 2.

Example 3

Styrene/the radical product in Preparation Example 1-2/AIBN (molar ratio=100/1/0.1) were added into a reaction bottle. DMAc serving as solvent was added to the reaction bottle for preparing solution (50 wt %). The solution was bubbled with nitrogen to deoxygenate for 30 minutes, and then heated to 80° C. and stirred to be reacted for about 4 hours. The reaction result was analyzed by GPC to measure its Mn, Mn=18036. The above reaction is shown below:

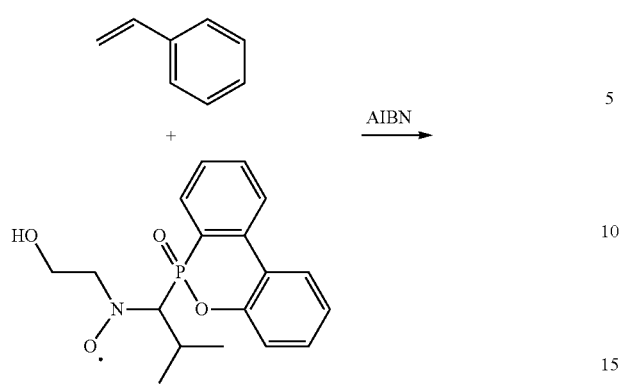

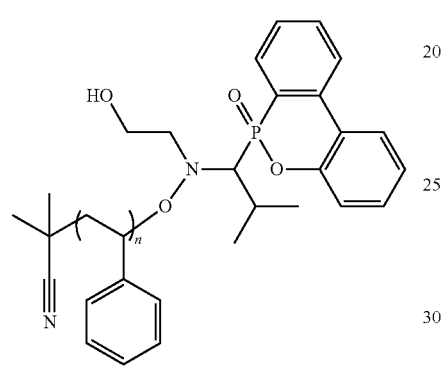

Example 4

Styrene/the radical product in Preparation Example 2-2/AIBN (molar ratio=100/1/0.1) were added into a reaction bottle. DMAc serving as solvent was added to the reaction bottle for preparing solution (50 wt %). The solution was bubbled with nitrogen to deoxygenate for 30 minutes, and then heated to 80° C. and stirred to be reacted for about 2 hours. The reaction result was analyzed by GPC to measure its Mn, Mn=12643. The above reaction is shown below:

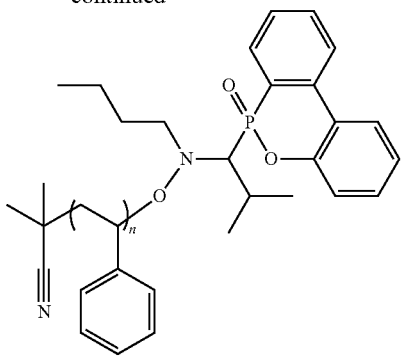

Comparative Example 3

Styrene/TIPNO•/TIPNO (molar ratio=100/1/0.1) were added into a reaction bottle. DMAc serving as solvent was added to the reaction bottle for preparing solution (50 wt %). The solution was bubbled with nitrogen to deoxygenate for 30 minutes, and then heated to 80° C. and stirred to be reacted for about 16 hours. The reaction result was analyzed by GPC to measure its Mn, Mn=910. The above reaction is shown below:

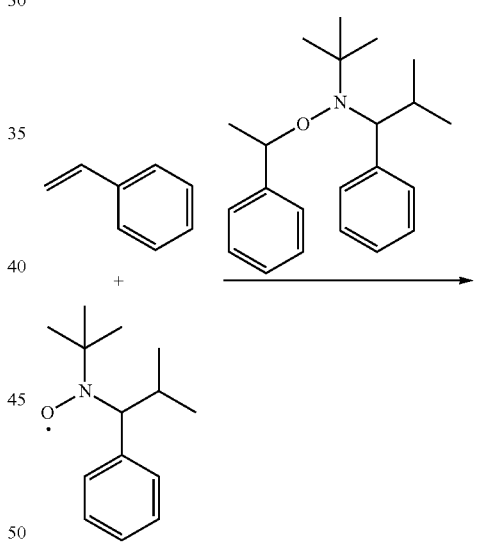

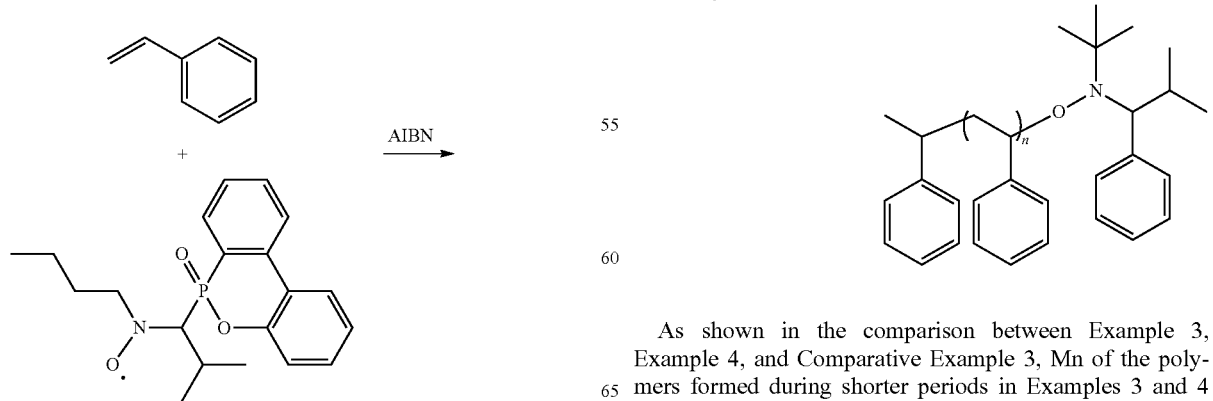

As shown in the comparison between Example 3, Example 4, and Comparative Example 3, Mn of the polymers formed during shorter periods in Examples 3 and 4 were dramatically larger than Mn of the polymer formed during a longer period in Comparative Example 3.

Example 5

Methyl methacrylate/the radical product in Preparation Example 1-2/BPO (molar ratio=100/1/0.1) were added into a reaction bottle. DMAc serving as solvent was added to the reaction bottle for preparing solution (50 wt %). The solution was bubbled with nitrogen to deoxygenate for 30 minutes, and then heated to 110° C. and stirred to be reacted for about 1 hour. The reaction result was analyzed by GPC to measure its Mn, Mn=15823. The above reaction is shown below:

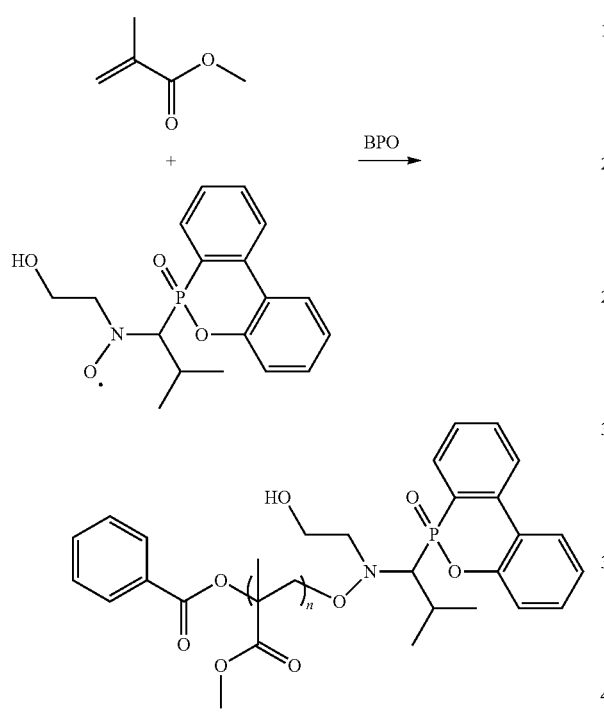

Comparative Example 4

Methyl methacrylate/TIPNO•/TIPNO (molar ratio=100/1/0.1) were added into a reaction bottle. DMAc serving as solvent was added to the reaction bottle for preparing solution (50 wt %). The solution was bubbled with nitrogen to deoxygenate for 30 minutes, and then heated to 75° C. and stirred to be reacted for about 12 hours. The reaction result was analyzed by GPC to prove that no new reaction was occurred.

Comparative Example 5

Methyl methacrylate/TIPNO•/TIPNO (molar ratio=100/1/0.1) were added into a reaction bottle. DMAc serving as solvent was added to the reaction bottle for preparing solution (50 wt %). The solution was bubbled with nitrogen to deoxygenate for 30 minutes, and then heated to 125° C. and stirred to be reacted for about 24 hours. The reaction result was analyzed by GPC to measure its Mn, Mn=5822. The above reaction is shown below:

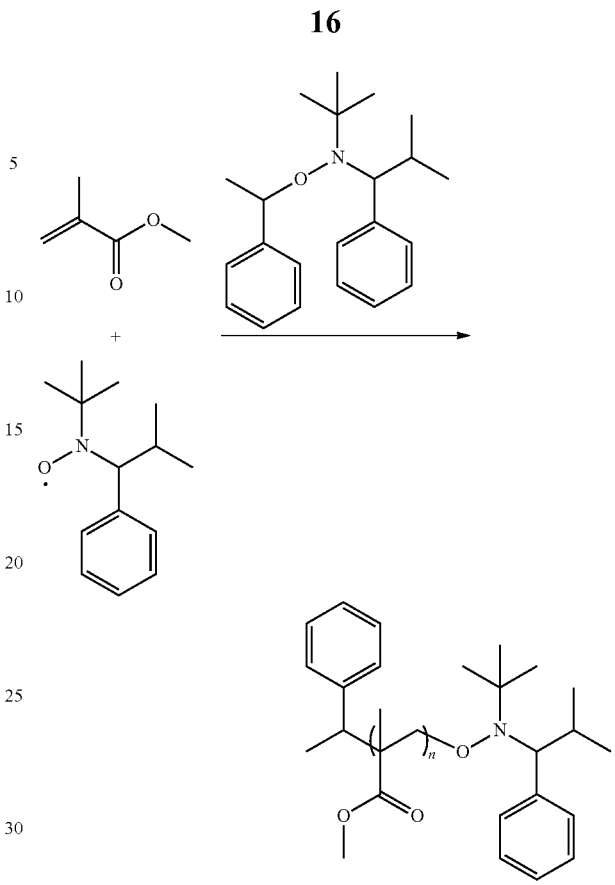

As shown in the comparison between Example 5 and Comparative Example 5, Mn of the polymer formed at a lower temperature during a shorter period in Example 5 was dramatically larger than Mn of the polymer formed at a higher temperature during a longer period in Comparative Example 5.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A radical, having a chemical structure of:

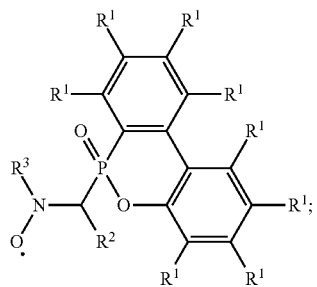

wherein each of $R^1$ is independently H, $C_{1-6}$ alkyl group, or $C_{1-6}$ alkoxy group;

$R^2$ is $C_{1-6}$ alkyl group; and $R^3$ is —$(C_xH_{2x})$—OH or —$(C_xH_{2x+1})$, and x is 1 to 8.

2. The radical as claimed in claim 1, wherein $R^2$ is $C_{2-4}$ alkyl group.

3. The radical as claimed in claim 1, wherein x is 2 to 5.

4. A compound, having a chemical structure of:

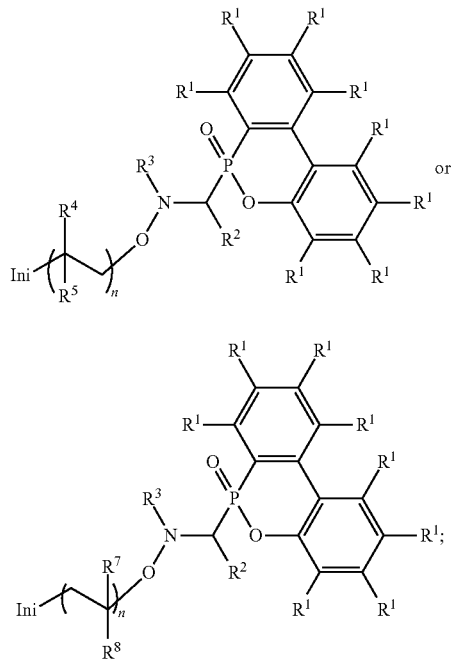

wherein each of $R^1$ is independently H, $C_{1-6}$ alkyl group, or $C_{1-6}$ alkoxy group;

$R^2$ is $C_{1-6}$ alkyl group;

$R^3$ is —$(C_xH_{2x})$—OH or —$(C_xH_{2x+1})$, and x is 1 to 8;

$R^4$ is H or $C_{1-6}$ alkyl group;

$R^5$ is

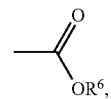

and $R^6$ is H or $C_{1-8}$ alkyl group;

$R^7$ is H or $C_{1-6}$ alkyl group, $R^8$ is

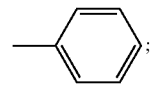

Ini is a residual group of a radical initiator; and n is an integer of 1 to 10000.

5. The alkoxy amine compound as claimed in claim 4, wherein $R^2$ is $C_{2-4}$ alkyl group.

6. The alkoxy amine compound as claimed in claim 4, wherein x is 2 to 5.

7. The alkoxy amine compound as claimed in claim 4, wherein the radical initiator comprises azobisisobutyronitrile or benzoyl peroxide.

* * * * *